United States Patent [19]

Hekal

[11] Patent Number: 4,857,343
[45] Date of Patent: Aug. 15, 1989

[54] PROCESS FOR THE LOW TEMPERATURE PASTEURIZATION OF LIQUID COMESTIBLES

[75] Inventor: Ihab M. Hekal, Stamford, Conn.
[73] Assignee: Continental Can Company, Inc., Norwalk, Conn.
[21] Appl. No.: 235,256
[22] Filed: Aug. 23, 1988
[51] Int. Cl.[4] .............................................. A23L 2/22
[52] U.S. Cl. ................................... 426/239; 204/131; 426/271; 426/330.5
[58] Field of Search ............... 426/239, 237, 244, 271, 426/330.3, 330, 330.4, 330.5; 204/131, 129, 130

[56] References Cited

U.S. PATENT DOCUMENTS

| | | | |
|---|---|---|---|
| 2,176,343 | 10/1939 | Howard | 204/131 |
| 2,848,400 | 8/1958 | Meier | 204/131 |
| 3,165,415 | 1/1965 | Kilburn | 426/239 |
| 4,317,841 | 3/1982 | Brambilla | 426/239 |
| 4,374,714 | 2/1983 | Hekal | 204/131 |
| 4,551,274 | 11/1985 | Shen | 204/131 |
| 4,676,988 | 6/1987 | Efstathiou | 426/271 |
| 4,695,472 | 9/1987 | Dunn | 426/237 |
| 4,771,126 | 9/1988 | Hirotsuka | 204/131 |
| 4,775,541 | 10/1988 | Brown | 426/330.4 |
| 4,781,809 | 11/1988 | Falcone | 426/239 |

Primary Examiner—Donald E. Czaja
Assistant Examiner—Carolyn Paden
Attorney, Agent, or Firm—Paul Shapiro

[57] ABSTRACT

Liquid comestibles are electrolytically treated to lower the pH thereof and the electrolytically treated liquid comestible is pasteurizable at temperatures lower than those normally used to effect pasteurization.

9 Claims, 1 Drawing Sheet

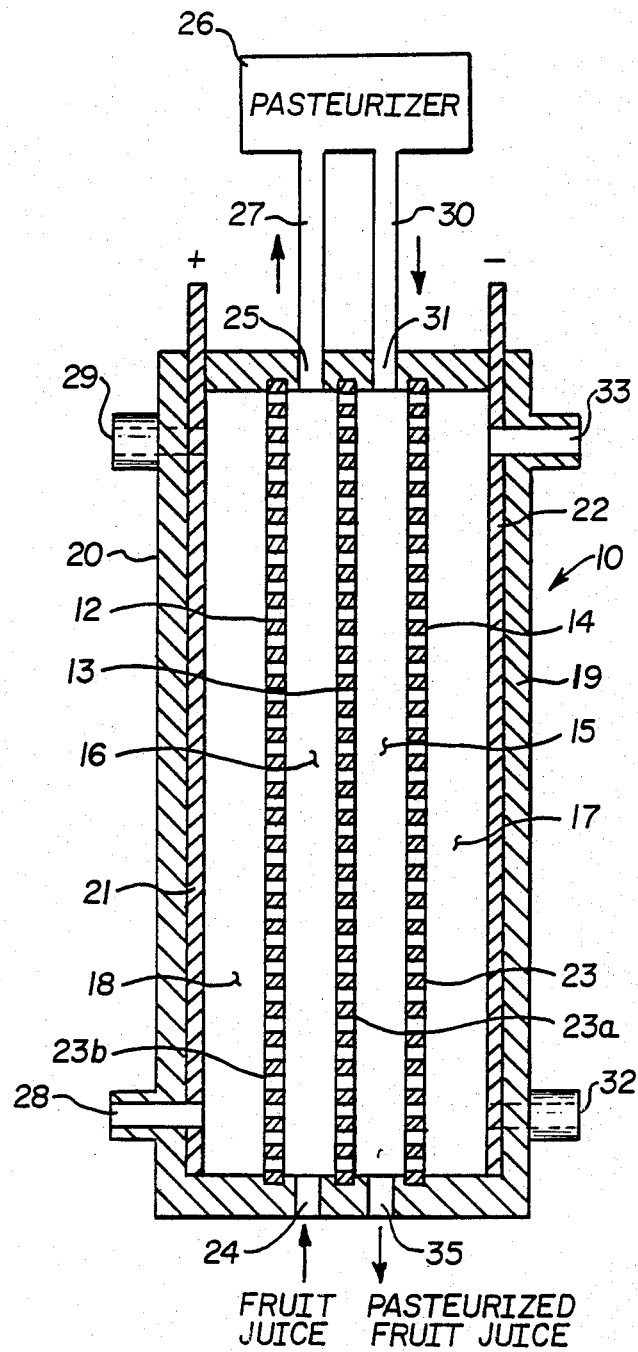

PROCESS FOR THE LOW TEMPERATURE PASTEURIZATION OF LIQUID COMESTIBLES

FIELD OF THE INVENTION

This invention relates to the treatment of liquid comestibles such as fruit and vegetable juices, wines and dairy products. More particularly, the invention relates to a low temperature pasteurization process for liquid comestibles and most particularly to a low temperature pasteurization process for fruit juices wherein the formation of off-flavors is minimized.

DESCRIPTION OF THE PRIOR ART

In the normal preparation of liquid comestibles such as fruit juices, and, in particular citrus juice such as orange and grapefruit juice, the juices are extracted, as by pressure, and, following extraction are heated to pasteurize the juice and retard enzymatic action by certain enzymes such as a-methyl esterase. The presence of enzymes such as a-methyl esterase in the juice, if not destroyed, will deleteriously affect the consistency of the juice rendering the juice watery and unappealing.

Temperatures in the range of 185°–210° F. are normally employed for the pasteurization of fruit juices such as orange juice. Highly acidic food products and beverages can be pasteurized at temperatures in the order of 160° F. or less to destroy undesirable microorganisms. However, in order to inactivate enzymes such as a-methyl esterase in fruit juice within reasonable time periods, i.e. 0.5 to 1.0 minute, the juice must be heated to temperatures in the order of 190° F. Such high temperature heating normally imparts to the juice a changed flavor which is easily distinguishable in most products. Frequently, the juices develop a brown or dark color referred to in the art as "carmelization," and the resulting product is frequently characterized as exhibiting a cooked flavor.

It is known to the art that reducing the pH of the fruit juice, which normally has a pH of 3.8 to 4.0, to a value of 3.0 or less, permits pasteurization and destruction of enzymes such as a-methyl esterase at temperatures of 140°–160° F. whereby the formation of off-flavors and carmelization of the juice is minimized. Attempts by the prior art to lower the pH of fruit juices have usually involved treatment of the juice with specific mineral acids such as sulfuric acid ($H_2SO_4$). However, after pasteurization, the original pH of the juice must be restored by neutralization with an alkaline reagent such as $Ba(OH)_2$ which forms an insoluble precipitate such as $BaSO_4$. This chemical treatment is costly, time consuming and commercially impractical as the trace quantities of $Ba^{++}$ and $SO_4^=$ ions which remain unprecipitated in the juice are construed as food additives and thereby subject to U.S Federal Drug Administration regulations which do not allow any food additives in citrus juices.

Thus there is a need in the art for a simple low cost process whereby the pasteurization of fruit juices such as orange juice can be effected at low temperatures, e.g. 160° F., or less without resort to chemical treatment.

Means which have been attempted by the art to change the acidity of fruit juices such as orange juice include electrodialysis. For example, U.S. Pat. No. 3,165,415 teaches the deacidification of fruit juice by passing the juice and an electrolyte such as sodium hydroxide through alternate compartments of a three-compartment electrochemical cell having ion selective membranes creating an exchange through the membranes and raising the pH of the juice by substitution of electrolyte ions (e.g., $OH^-$) for acid ions (e.g., citrate ions) originally present in the juice.

Another attempt at deacidification of liquid food products such as coffee and tea is disclosed in European patent application 0049497 which discloses an electrodialysis system comprising a pair of electrodes and two or more membranes which are either exclusively cation permeable or exclusively anion permeable, wherein a feed stream is separated by a membrane from a waste stream, the latter containing a dilute aqueous acid solution when the membranes are cation permeable and a dilute aqueous basic solution when the membranes are anion permeable, to which system the application of an electric field between the electrodes causes migration through the membranes of either protons or hydroxyl ions out of the waste stream into the feed stream and either cation or anions respectively out of the feed stream towards their respective attracting electrodes.

Other attempts at electrochemical treatment of fruit juices include U.S. Pat. No. 4,374,714 which teaches that the susceptibility to color and flavor loss due to oxidative deterioration is reduced by placing the juice in the cathode compartment of an electrochemical cell in which the compartments of the cell containing the anode and cathode are separated by a cation permeable membrane and the anode compartment contains a highly dissociatable, non-oxidizable inorganic acid electrolyte, and thereafter subjecting the juice to an electrical current for a short period of time sufficient to generate hydrogen at the cathode to remove oxygen from the juice but insufficient to effect any substantial chemical change in the juice. The process disclosed in U.S. Pat. No. 4,374,714 does not affect any change in the acidity of the juice.

SUMMARY OF THE INVENTION

The practice of the present invention provides for the treatment of liquid comestibles and particularly the low temperature pasteurization of fruit juices wherein the liquid comestible such as fruit juice and an electrolyte are flowed separately through separate compartments of an electrochemical cell, the cell being comprised of an enclosure, a plurality of ion selective membranes disposed in spaced relation to define a plurality of permeation compartments within the enclosure wherein first and second membranes are cation permeable and are disposed in side-by-side relation to define a first permeation compartment, a third membrane being anion permeable and disposed in spaced relation opposite one of the first and second membranes to define a second permeation compartment and an anode disposed in spaced relation to one of the membranes most proximate to said first permeation compartment to form an anode compartment therewith and a cathode on the side of the membrane most proximate to said second permeation compartment, to form a cathode compartment therewith. A liquid comestible such as fruit juice containing alkali metal cations and organic acid anions is passed into the first permeation compartment, an electrolyte comprised of a basic solution containing alkali metal cations and hydroxyl anions is passed into the cathode compartment and an acid electrolyte solution containing hydrogen cations and acid anions is passed into the anode compartment. An electrical field is applied across the first and second permeation compartments between the anode and cathode, to cause the passage of hydrogen cations into the first permeation compartment and alkali metal cations into the second permeation compartment, the hydrogen cation by replacing the alkali metal cation effecting a reduction in the pH of the liquid comestible. The liquid comestible of reduced pH is withdrawn from the first compartment and heated to a temperature which is below its normal pasteurization temperature e.g. in the case of fruit juice is 160° F. or less for a time sufficient to effect pasteurization thereof. The pasteurized liquid comestible is passed through the second permeation compartment for recombination of the metal cations with the organic acid anions of the liquid comestible. With fruit juices the recombination of metal cations with the organic acid anions in the juice reconstitute the juice with alkali metal ion and the pasteurized, reconstituted juice is withdrawn from the second permeation compartment whereby product retaining the natural flavor of the juice is obtained.

BRIEF DESCRIPTION OF THE DRAWING

The single Figure of the drawing schematically illustrates one embodiment of an apparatus to effect the low temperature pasteurization of a liquid comestible such as fruit juice in accordance with the practice of the present invention.

PREFERRED EMBODIMENT OF THE INVENTION

Now, one preferred embodiment of this invention will be described below with reference to the accompanying drawing wherein electrochemical cell 10 provides means whereby the pH of fruit juice is lowered from an original value of about 3.8-4.0 to a lower value in the order of about 3.0 or less rendering the fruit juice suitable for pasteurization at relatively low temperatures of 160° F. or less.

The electrochemical cell 10 may be any well-known type of membrane assembly such as a plate and frame assembly wherein a plurality of planar membranes 12, 13, and 14 in parallel spaced relation form a pair of parallel permeation compartments 15, 16 and end compartments 17, 18 with wall members 19, 20. Permeation compartment 16 is defined by membranes 12, 13, permeation compartment 15 is defined by membranes 13 and 14, end compartment 17 is defined by membrane 14 and wall member 19 and end compartment 18 is defined by membrane 12 and wall member 20. An anode 21 is disposed within end compartment 18 and a cathode 22 is disposed within the end compartment 17. Anode 21 and cathode 22 are connected respectively to the positive and negative terminals of a suitable electric power source (not shown). The anode 21 and cathode 22 are supported within the wall members 19, 20 which are formed of a non-toxic synthetic resin such as polypropylene. The electrodes themselves are suitably made of non-toxic, electrically conductive material, the anode usually being a noble metal, for example platinum, platinum plated titanium, columbium, ruthenium and ruthenium plated titanium and the cathode being usually stainless steel.

Membranes 12 and 13 are cation permeable, anion impermeable and membrane 14 is anion permeable, cation impermeable. The membranes 12, 13, and 14 are supported in the electrochemical cell 10 by porous, planar support members 23, 23a, 23b. The cation permeable membranes 12, 13 may be of various suitable types, such, for example as the type available commercially under the trademark "Nafion" from the E.I. Dupont De Nemours & Company. Nafion membranes are prepared by reacting $SO_2$ with tetrafluoroethylene to form a cyclic sulfone which in turn is reacted with hexafluoropropylene epoxide to give sulfonyl fluoride adducts which are reacted with sodium carbonate to yield a sulfonyl fluoride vinyl ether. The vinyl ether produced is polymerized with tetrafluoroethylene to give a Perfluorocarbon sulfonyl fluoride copolymer from which the Nafion membrane is fabricated. Nafion membranes are available in thicknesses of 3.5-10 mils.

The anion permeable membrane 14 may be of the various suitable types, such as for example as the type available commercially under the trademarks "Neosepta" from Tokiyama Soda, "Raipore" from RAI Corporation and type AR-103 from Ionics, Inc. Neosepta membranes are hydrocarbon polymers containing pendant amino groups. Raipore membranes comprise quaternized bromides of vinyl pyridine grafted on a fluorinated base polymer. Type AR-103 membranes are copolymers of vinyl compounds containing quaternized ammonium groups and tertiary amino groups.

In the operation of the electrochemical cell 10, an anolyte is pumped into the anode compartment 18, through inlet 28 at the bottom of the electrochemical cell 10 and is discharged from the anode compartment 18 by way of outlet 29 located at the top of the electrochemical cell. In the line to inlet 28 are placed proportioning means such as valves, (not shown) for controlling the flow rate of the anolyte solution relative to that of the fruit juice being pumped through permeation compartment 16 by pump means (not shown). The anolyte is generally a solution of a dissociatable, nonoxidizable mineral acid such as sulfuric acid or phosphoric acid the solution having an acid concentration in the range of about 0.1 to about 10 percent by weight and preferably about 0.5 to about 5 percent by weight of the acid. A highly dissociatable anolyte is required in the practice of the present invention in order that the anolyte in the anode compartment 18 have a high order of electrical conductivity to permit the rapid passage through the cell of the high current density required for the lowering of the pH of the fruit juice to be operative and practical. No cation except hydrogen ion should be present in the anode compartment 18 as such cations will pass through the cation permeable membrane 12 and contaminate the fruit juice which is passed through compartment 16. Thus, if an electrolyte such as NaOH is used, the $Na^+$ cation will pass through the cation permeable membrane 12 and contaminate the fruit juice being circulated through the compartment 16 with sodium ion.

As will be seen from the Figure, the fruit juice to be treated to lower the pH is introduced into the permeation compartment 16 of the cell 10 by way of an inlet 24 of the compartment 16. In the line to the inlet 24 there normally is a proportioning means such as a valve or pump, not shown, for controlling the flow rate of the fruit juice. The pH of the fruit juice entering the permeation compartment 16 is lowered by the passage of a high current density through the cell as the fruit juice is circulated through the permeation compartment 16.

To effect a lowering of the pH of the fruit juice in accordance with the present invention, the current imposed on the fruit juice as it is passed through the permeation compartment 16 is generally in the range of about 100 to 200 amperes and preferably in the range of about 120 to about 180 amperes. At these amperages, voltages in the order of about 20 to about 40 volts are employed.

In carrying out the process of the present invention using the apparatus shown in the Figure, when a direct current of suitable voltage is applied across the electrodes 21, 22, the metal cations present in the fruit juice, are caused to migrate toward the cathode 22. The negatively charged cation permeable membranes 12, 13 forming the permeation compartment 16 of the electrochemical cell 10 allow permeation of the metal cations toward the cathode, but being negatively charged repel the organic acid anions. In this manner, metal cations from the fruit juice in compartment 16 migrate from the fruit juice into the second permeation compartment 15, the organic acid anions remaining in the juice. Once the metal cations have migrated into the permeation compartment 15, they remain there, further migration of these ions to the cathode 22 being prevented by the positively charged anion permeable membrane 14 which repels the positively charged cations causing these cations to be retained in permeation compartment 15. When the fruit juice being electrochemically treated is a citrus juice, such as orange juice, the metal cation is potassium ion ($K^+$) and the organic acid anion is citrate ion.

Hydrogen cation ($H^+$) present in anode compartment 18 migrates through the cation permeable membrane 12 into the permeation compartment 16 to replace the metal cation which has migrated into permeation compartment 15 so as to combine with the organic acid anion to form the organic acid whereby a lowering of the pH of the fruit juice is effected. When the fruit juice being electrochemically treated is a citrus juice, such as orange juice, the combination of $H^+$ cation with citrate anion forms citric acid.

At the anode excess $OH^-$ is reacted to form oxygen in accordance with the equation $$2\ OH^- \rightarrow H_2O + \tfrac{1}{2}O_2 + 2e$$

The oxygen that is formed is vented from the anode compartment 18 via gas outlet not shown.

After the unpasteurized fruit juice in compartment 16 has been electrochemically treated for a time sufficient to effect the desired lowering of the pH, the treated fruit juice is discharged from compartment 16 through outlet 25 and is pumped (by means not shown) into pasteurizer 26 via inlet line 27. The pasteurizer 26 is a conventional heat exchange device capable of heating the fruit juice to temperatures of 140°–160° F. for about 0.5 to 1.0 minute to effect pasteurization of the electrochemically treated fruit juice.

The fruit juice after pasteurization in the pasteurizer 26 is discharged from the pasteurizer through outlet line 30 and pumped (by means not shown) into permeation compartment 15 via inlet 31 at the top of the electrochemical cell 10. Upon its passage through the permeation compartment 15, a portion of the organic acid anion present in the pasteurized fruit juice is neutralized with the metal cation that originally permeated into compartment 15 during the electrolytic treatment of the unpasteurized fruit juice in compartment 16.

Catholyte comprised of a solution of a strong, non-reduceable, alkali base such as KOH at a concentration of 0.1 to 10 percent by weight and preferably about 0.3 to about 3 percent by weight enters the cathode compartment 17 through inlet 32 at the bottom of the electrochemical cell 10 and is discharged from the compartment 17 by way of outlet 33 located at the top of the electrochemical cell 10. In the line to inlet 32 there are provided proportioning means such as valves, not shown, for controlling the flow rate of the alkali base through the compartment 17.

Hydroxyl ion ($OH^-$) present in the cathode compartment 17 migrates through the anion permeable membrane 14 into the pasteurized fruit juice being circulated through compartment 17 to neutralize the excess $H^+$ in the pasteurized fruit juice whereby the original pH and organic acid metal salt concentration of the unpasteurized fruit juice is restored in the pasteurized fruit juice.

Excess $H^+$ in cathode compartment 17 is generated as hydrogen gas in accordance with the equation $$2\ OH^- \rightarrow H_2O + \tfrac{1}{2}O_2 + 2e$$

The hydrogen gas being is released from the cathode compartment 17 by vent means not shown.

The pasteurized, reconstituted fruit juice is discharged from the second permeation compartment 15 via outlet 35. Thereafter the pasteurized, reconstituted fruit juice may be fed directly into cans, bottles and other containers and these containers are then sealed and stored.

By means of the low temperature pasteurization process of the present invention there is provided a fruit juice product exhibiting a natural taste and a minimum of off-flavors. Furthermore, the process of the present invention makes possible the manufacture of improved concentrated or single strength juices for non-refrigerated shelf storage.

The present invention will now be illustrated by the following examples.

EXAMPLE I

The low temperature pasteurization apparatus of the Figure was used to demonstrate the process of the present invention.

Single strength orange juice was electrochemically treated in accordance with the process of the present invention using an electrolytic cell 10 having an anode compartment 18 having a capacity of 1.0 liter and a cathode compartment 17 having a capacity of 1.0 liter. The permeation compartment 16 in which the orange juice was electrochemically treated was formed by a pair of Nafion cation permeable membranes 12, 13 having a thickness of 7 mils and a surface area of 64 square inches ($in^2$). The Nafion membranes were supported by porous separators 23a, 23b formed of polypropylene. The anode 21 was formed of platinized titanium having a surface area of 0.32 $in^2$. The compartment 15 in which the orange juice was reconstituted with $K^+$ ion was formed between the Nafion cation permeable membrane 13 and a Neosepta AV-4T anion permeable membrane 14 having a thickness of 10 mils. The membrane 14 was also supported by a porous polypropylene separator 23. The cathode was stainless steel having a surface area of 64 $in^2$.

Chilled (42° F.) single strength orange juice pH 4.0 was passed through compartment 16 at the rate of 1.1–1.2 liters per minute. An anolyte composed of 3N $H_3PO_4$ was circulated through the anode compartment at the rate of 10 liters/min. at a temperature of 120° F. A catholyte composed of 1N KOH was circulated through the cathode compartment at the rate of 10 l/min at a temperature of 120° F. A D.C. current of 120-170 amps at a voltage of 40 volts was applied to the cell for a period of 18-24 minutes to effect a lowering of the pH of the juice passed through compartment 16.

The juice electrochemically treated in compartment 16 was discharged therefrom and pumped into pasteurizer 26 and the orange juice heated at 160° F. for 0.5 minutes to effect pasteurization thereof. The pasteurized orange juice was discharged from pasteurizer 26 and pumped into compartment 15 at the rate of 0.1 l/min. to be reconstituted with K+. Thereafter the orange juice was passed into glass containers and analyzed for taste as well as the activity of the enzyme pectin methylesterase (measured in P.E.U. units). In analyzing pectin methylesterase activity a solution of citrus pectin and sodium chloride is prepared and a sample of the juice to be tested for enzyme activity is added to the solution. The pH of the solution is adjusted 7.0 and thereafter 0.02N NaOH from a buret is added to the solution to maintain the solution at 7.0. The amount of NaOH added and the time required to return the pH of the sample to 7.0 is recorded. P.E.U. is then calculated as follows:

$$P.E.U. = \frac{ml\ NaOH \times N\ NaOH}{ml\ of\ sample \times time\ in\ minutes} \times 10^4$$

The results are summarized in Table I below.

TABLE I

| Run No | Control | 1 | 2 |
|---|---|---|---|
| Unpasteurized juice treatment time (minutes) | 0 | 24 | 18 |
| DC current |  |  |  |
| volts | 0 | 32 | 36 |
| amps | 0 | 120 | 170 |
| pH unpasteurized electrolytically treated juice | 3.96 | 3.20 | 2.75 |
| pH pasteurized reconstituted juice | 3.96 | 3.92 | 3.78 |
| P.E.U. pasteurized reconstituted juice | 1.15 | 0 | 0 |

The results recorded in Table I demonstrate that enzyme activity in orange juice pasteurized in accordance with the present invention (Run Nos. 1 and 2) is eliminated even though the juice is pasteurized at a relatively low temperature, namely 160° F.

A taste test of the pasteurized juice electrochemically treated in accordance with Run Nos. 1 and 2 indicated that it had a fresh taste and did not taste processed.

EXAMPLE II

The procedure of Example I was repeated with the exception that the pasteurization temperature was 140° F. The results summarized in Table II below indicate that orange juice electrochemically treated in accordance with the present invention can be pasteurized at 140° F. to eliminate enzyme activity in the juice (Run No. 3).

TABLE II

| Run No. | Control | 3 |
|---|---|---|
| Unpasteurized juice treatment time (minutes) | 0 | 20 |
| DC current |  |  |
| volts | 0 | 38.2 |
| amps | 0 | 130 |
| pH unpasteurized electrolytically treated juice | 3.86 | 3.0 |
| pH pasteurized reconstituted juice | 3.85 | 3.80 |
| P.E.U. pasteurized reconstituted juice | 1.85 | 0 |

What is claimed is:

1. A process for the treatment of liquid comestibles which comprises providing an electrochemical cell in which the liquid comestible and electrolyte are separately flowed through separate compartments of the cell, the cell being comprised of an enclosure, a plurality of ion-selective membranes disposed in spaced relation to define a plurality of permeation compartments within said enclosure wherein a first and a second membrane are cation permeable and form a first permeation compartment, a third membrane is anion permeable and disposed opposite one of said first and second membranes to form therewith a second permeation compartment, an anode disposed on one side of the first permeation compartment, a cathode disposed on one side of the second permeation compartment opposite the anode and separated therefrom by the membranes, the anode and cathodes forming anode and cathode compartments with the first and third membranes respectively, circulating a liquid comestible containing metal cations and organic acid anions through said first compartment to effect removal of metal cations from the liquid comestible by permeation of the metal cations into the second permeation compartment, circulating an alkali metal base through the cathode compartment and a mineral acid through the anode compartment, applying an electrical field across the first and second permeation compartments between the anode and cathode, withdrawing the liquid comestible from the first permeation compartment, the liquid comestible having a reduced metal cation content, heating the liquid comestible withdrawn from the first permeation compartment at a temperature effective to pasteurize the liquid comestible, passing the pasteurized liquid comestible through the second permeation compartment for recombination of metal cations with the organic acid anions in the pasteurized liquid comestible and then withdrawing the pasteurized liquid comestible from the second permeation compartment.

2. The process of claim 1 wherein the metal cation is potassium ion.

3. The process of claim 1 wherein the organic acid anion is citrate ion.

4. The process of claim 1 wherein the alkali base is potassium hydroxide.

5. The process of claim 1 wherein the mineral acid is phosphoric acid.

6. The process of claim 1 wherein the liquid comestible is fruit juice.

7. The process of claim 6 wherein the electrochemically treated fruit juice is pasteurized at at a temperature of 160° F. or less.

8. The process of claim 6 wherein the fruit juice is a citrus juice.

9. The process of claim 8 wherein the citrus juice is orange juice.

* * * * *